Oct. 8, 1929.  G. A. GILLEN  1,730,420
COINCIDENTAL LOCK FOR MOTOR VEHICLES
Filed April 15, 1925    2 Sheets-Sheet 1
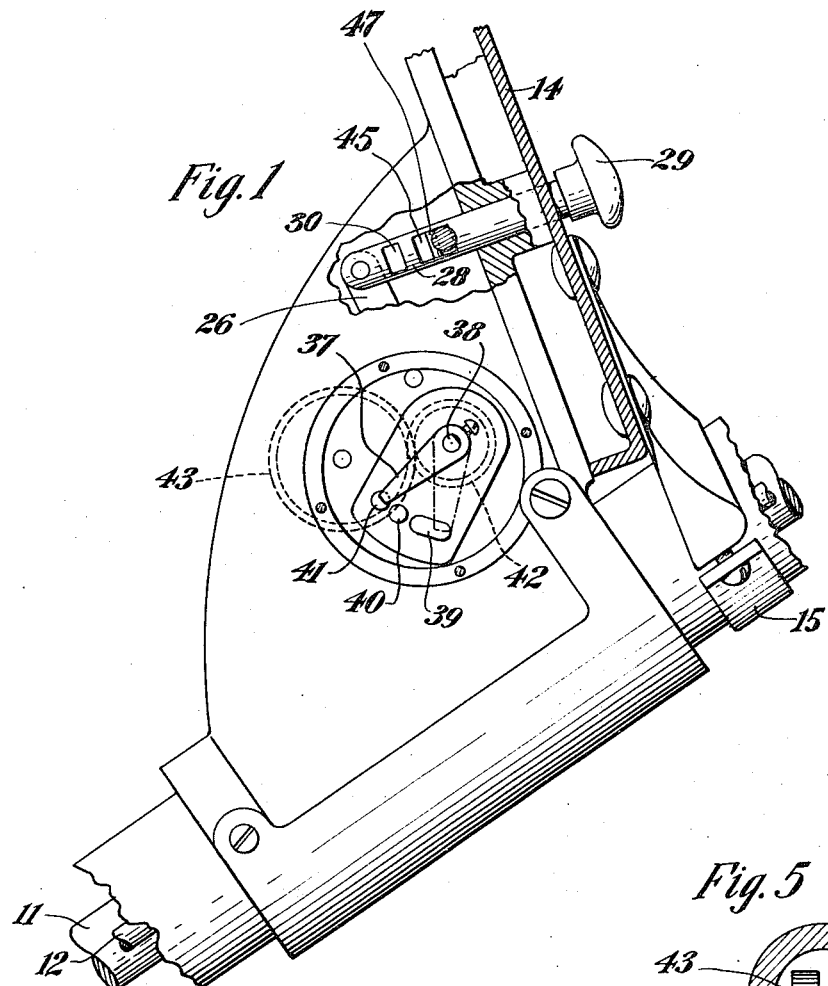
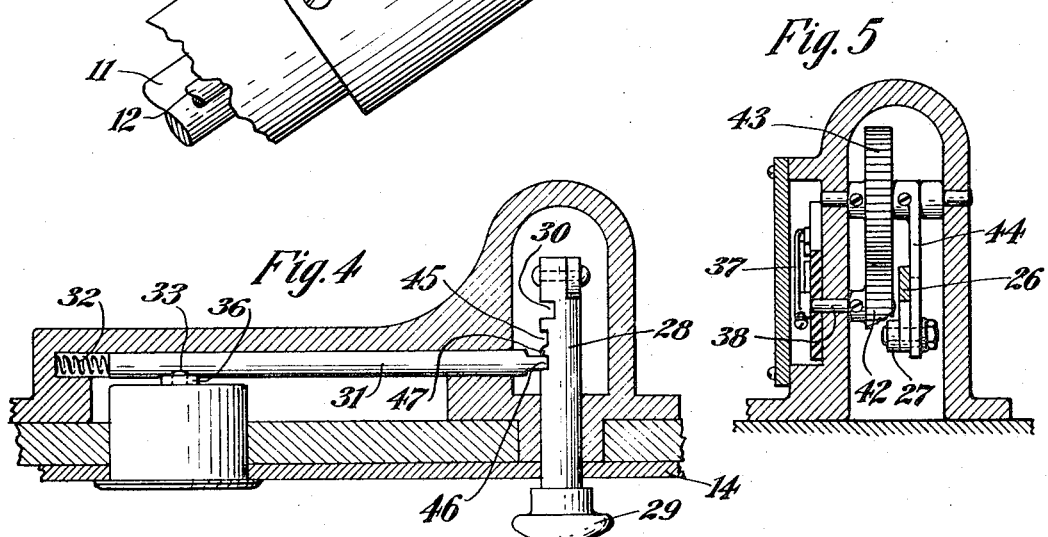
Inventor:
George A. Gillen,
By [signature] Att'y

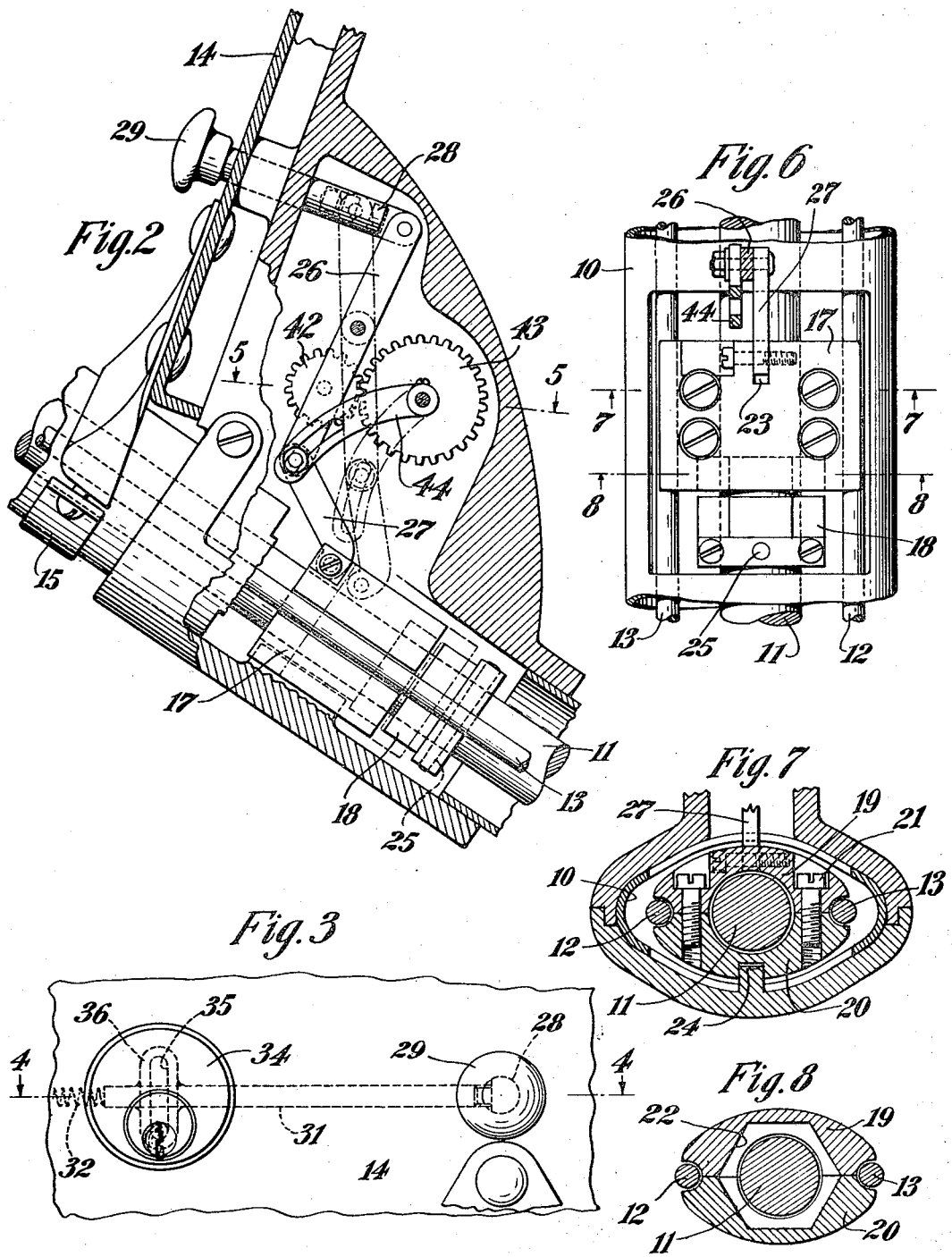

Patented Oct. 8, 1929

1,730,420

UNITED STATES PATENT OFFICE

GEORGE A. GILLEN, OF JERSEY CITY, NEW JERSEY, ASSIGNOR TO GILLEN, KIMMEY, BAKER SYNDICATE, INCORPORATED, OF NEW YORK, N. Y.

COINCIDENTAL LOCK FOR MOTOR VEHICLES

Application filed April 15, 1925. Serial No. 23,238.

This invention relates to improvements in locks for motor vehicles and more particularly to a quite recent development known to the trade as coincidental locks.

The principal object of the present invention resides in the provision of a locking device for securing the steering mechanism to render the same useless and simultaneously ground or otherwise render the ignition system of a motor vehicle useless.

Another object of the invention is to provide a device so designed that the controlling plunger may also be used for cutting in the magneto circuit and simultaneously cutting out the battery circuit or vice versa by a single motion.

As a further object, the invention contemplates the provision of a locking device particularly adapted for use on the steering column of a "Ford" automobile which securely locks the steering wheel against functioning utilizing the spark and gas control rods as guides for the locking element and as what might be termed a secondary line of defense.

Still another object of the invention is to provide a "fool proof" device which will prevent the operator from shutting off his motor without locking the car.

With the above and other objects in view which will become more apparent as the description proceeds, the invention consists in the novel construction, combination and arrangement of parts which will be fully set forth in the following specification, claimed and illustrated in the accompanying drawing, in which:—

Fig. 1 is a side view of this improved lock, portions being in section to more fully illustrate the details thereof.

Fig. 2 is a vertical sectional view through the lock.

Fig. 3 is a front view of a fragment of the instrument board, showing the relation of the locking plunger to the lock cylinder.

Fig. 4 is a horizontal sectional view taken on line 4—4 of Fig. 3.

Fig. 5 is a sectional view taken on line 5—5 of Fig. 2.

Fig. 6 is a fragmentary view of the steering column showing the cut out portion for permitting the assembling of the locking elements on the steering shaft and control rods.

Fig. 7 is a transverse sectional view taken on line 7—7 of Fig. 6, showing the lock housing in assembled position, and Fig. 8 is a transverse sectional view of the locking element which is secured to the steering shaft.

Referring to the drawings, the numeral 10 designates the steering column of a motor vehicle which, in the present instance, is substantially diamond shaped and houses the steering shaft 11 and the spark and gas control rods 12 and 13 respectively. The steering column above referred to is secured to the lower edge of the instrument board 14 by means of a clamp 15 in the customary manner.

The steering column 10 is cut away at both top and bottom just forward of and slightly below the instrument board 14 to facilitate the positioning locking elements 17 and 18 on the steering shaft 11.

The locking element 17 comprises a pair of halves 19 and 20 which are secured together by means of suitable screws 21 in such position as to embrace the steering shaft 11 and to partially embrace the spark and gas control rods 12 and 13. Each of these halves is recessed in one end in such a manner that when assembled, a hexagonal recess 22 is provided in the end of the locking element 17. The upper half 19 is slotted at 23 at its end opposite that provided with the recess while the lower half 20 is provided with a longitudinal groove 24 for an obvious purpose.

From the foregoing it will be understood that the locking element 17 is free to slide on the steering shaft but rotation thereof is prevented by reason of its partial embrace of the spark and gas control rods 12 and 13.

In order that the steering shaft may be locked against rotation, the locking element 18 is provided and comprises a pair of halves which like those of the locking element 17 embrace the steering shaft 11 and are clamped tightly thereon so as to avoid relative rotation between the shaft and locking element. To further ensure against relative rotation thereof, a pin 25 extends diametrically through the shaft and the locking element. When assembled on the shaft, the locking element 18 provides a hexagonal male element which enters the hexagonal recess 22 so that when in locked position, the shaft 11 will be securely held against rotation.

The steering wheel locking mechanism above referred to is manipulated by a lever 26 which is pivotally mounted intermediate its ends and has connected to its lower end a link 27 which is in turn pivoted in the slot 23 previously mentioned. The end of the lever opposite that to which the link 27 is connected, is pivotally secured to the controlling plunger 28 which extends outwardly through the instrument board and is provided with a knob or handle 29 by which it may be readily grasped. From the foregoing it will be seen that by moving the plunger inwardly or outwardly, the locking elements 17 and 18 may be disengaged or engaged at the will of the user.

In order that the device may be secured in locked position, the plunger is provided near its inner end with a relatively deep notch 30 for the reception of one end of the locking bolt 31. This bolt is urged into contact with the plunger 28 by means of a spring 32 and it will thus be seen that when the plunger is wholly withdrawn the bolt will enter the notch 30 and lock the same against movement. Withdrawal of the bolt from engagement in the notch 30 is controlled by means of a pin 33 which is eccentrically mounted on the inner end of the lock cylinder of a pin tumbler lock 34, and rides in a slot 35 formed in the cross member 36 carried by the bolt 31.

In order to control the ignition circuit of the vehicle on which the device is used, there is provided a switch arm 37 which is secured to the shaft 38 and engages the contacts 39, 40 and 41 which are respectively connected with the ground, battery and magneto of the vehicle. To the opposite end of said shaft 38 is secured a pinion 42 which meshes with and is actuated by a gear 43 mounted near the pivot or fulcrum of the lever 26. Secured to the mounting of the gear 43 is an arm 44 which is slotted to a point near its free end to receive the pivot, connecting the link 27 to the lever 28. It will thus be seen as the lock is manipulated, the switch arm 37 will be moved across the contact points to the desired position. To provide for easy throwing and proper positioning of the switch arm, the plunger 28 is formed near its outer end with a pair of relatively closely spaced shallow notches 45 and 46 separated by a curved wall 47 which permits of ready but limited movement of the plunger when unlocked, so that the switch arm may be easily and quickly moved from the battery to the magneto contact or vice versa with accuracy. Owing to the fact that the notches 45 and 46 are relatively shallow, it will be understood that at no time will it be necessary to manipulate the key in the lock cylinder in shifting between the battery and magneto, nor may the key be withdrawn while the lock remains in unlocked position. Furthermore owing to this structure, it is impossible to pass from unlocked to locked position without turning the key sufficiently to wholly withdraw the bolt 31. In this manner the device is rendered entirely safe for the most inexperienced, as at no time can the ignition be interrupted and the motor stopped without locking the steering wheel.

From the foregoing, it will be seen that the locking elements must be engaged so as to prevent turning of the steering wheel prior to complete cutting out of the ignition so that there is a slight lag between the actual locking of the car and the shutting off of the motor, thus making it imperative for the user to actually lock his car prior to stopping the motor. This result is sought by the authorities charged with the protection of such property in order to avoid the now common practice of many drivers of shutting off their motors and leaving the car unlocked and easy prey for the lawless.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. Coincidental lock mechanism for the steering or other control and the ignition of a motor vehicle comprising a handle bolt for controlling both said control and the ignition, said bolt being operable by hand to freely switch the ignition on and off and provided with locking shoulders and locking means engageable with the locking shoulders of the handle bolt and operable solely by a key.

2. Coincidental lock mechanism for the steering or other control and the ignition of a motor vehicle comprising a handle bolt for controlling both said control and the ignition, said bolt being operable by hand to freely switch the ignition on and off and provided with locking shoulders, locking means engageable with the locking shoulders of the handle bolt and operable solely by a key, one of said locking shoulders having an impositive and another a positive locking engagement with the locking means.

GEORGE A. GILLEN.